United States Patent
Brodnick

(10) Patent No.: US 6,584,182 B2
(45) Date of Patent: Jun. 24, 2003

(54) METHOD AND APPARATUS FOR COMMUNICATING DATA OVER A TELEPHONE LINE USING AN ACOUSTIC MODEM

(75) Inventor: Donald E. Brodnick, Cedarburg, WI (US)

(73) Assignee: GE Medical Systems Information Technologies, Inc., Milwaukee, WI (US)

( * ) Notice: Subject to any disclaimer, the term of this patent is extended or adjusted under 35 U.S.C. 154(b) by 0 days.

(21) Appl. No.: 09/682,378

(22) Filed: Aug. 27, 2001

(65) Prior Publication Data

US 2003/0039343 A1 Feb. 27, 2003

(51) Int. Cl.$^7$ ............................................... H04M 11/00
(52) U.S. Cl. ...................... 379/93.37; 379/443; 379/444
(58) Field of Search .......................... 379/90.01, 93.05, 379/93.06, 93.37, 442, 443, 444, 52, 106.02

(56) References Cited

U.S. PATENT DOCUMENTS

| | | | |
|---|---|---|---|
| 5,001,746 A | * 3/1991 | Nishijima | ................ 379/93.37 |
| 5,134,649 A | * 7/1992 | Gutzmer | .................. 379/93.37 |
| 5,995,599 A | 11/1999 | Dunn et al. | |
| 6,102,856 A | 8/2000 | Groff et al. | |
| 6,219,408 B1 | 4/2001 | Kurth | |

* cited by examiner

*Primary Examiner*—Melur Ramakrishnaiah
(74) *Attorney, Agent, or Firm*—Michael Best & Friedrich LLP

(57) ABSTRACT

The present invention provides systems and methods for the communication of data over telephone lines. A handset orientation tolerant bi-directional acoustic modem according to the invention includes a first transducer operable as a receiving unit under a first condition and as a transmitting unit under a second condition, a second transducer operable as a transmitting unit under the first condition and as a receiving unit under the second condition, and a controller capable of determining the presence of one of the first and the second condition. The presence of the first condition or second condition depends on how the microphone and the speaker of a telephone handset are aligned with respect to the two transducers. The acoustic modem determines the alignment by listening for a detectable dial tone, and then under the first or the second condition, the acoustic modem automatically transmits data to a central site for analysis.

46 Claims, 3 Drawing Sheets

METHOD AND APPARATUS FOR COMMUNICATING DATA OVER A TELEPHONE LINE USING AN ACOUSTIC MODEM

BACKGROUND OF INVENTION

The present invention relates to devices used to communicate data over telephone lines, and more particularly, to handset orientation tolerant bi-directional acoustic modems.

Patients with specific health conditions may require constant or frequent observation by their physicians. However, confinement to a health care facility during this observation is typically not desirable for the patient. As a solution to this problem, physicians are increasingly monitoring their patients with remote devices. The physician is still able to observe and examine the biomedical data of the patient, and the patient enjoys a certain degree of freedom.

When the patient is remotely monitored, they typically have some type of event recorder that acquires the biomedical data of interest. At certain intervals established by the physician, the patient needs to transmit the data to a central site for analysis by a health care provider. Generally, the data is transmitted over a telephone line using a conventional acoustic modem.

Conventional acoustic modems typically rely on one way communication from the event recorder to a central site where the data can be reviewed by the health care provider. For operation, the patient must dial the phone, communicate over the phone with a receiving authority at the central site to determine when transmission can begin, align the microphone of the telephone handset with the speaker of the acoustic modem, trigger the transmission, determine when the transmission is complete, and determine whether transmission of the data needs to be repeated. Many of the patients that are remotely monitored are elderly, sick, feeble, intimidated or confused by the monitoring procedures and equipment, or not highly motivated to operate the transmission of the biomedical data to the central site. Additionally, the patients may be agitated because they have just experienced some type of medical symptom. Thus, it would be advantageous to provide a device that simplifies the process of transmission of biomedical data to the central site for the patient.

When the patient transmits the data using a conventional acoustic modem, it is important to align the speaker or transmitter box of the event recorder with the microphone on the handset of the telephone. The transmitter box of the event recorder includes an acoustic coupler or modem on its top surface. The handset of the phone through which the data is being transmitted to a receiving station at the central site (e.g., hospital or physician's office) is placed within acoustic range of, or adjacent to, the transmitter box. A misconfiguration of the handset and transmitter box may corrupt the communication of data and render the data received at the central site useless. When a sampling of data takes several minutes to acquire and transmit, this can be a frustrating experience for both the patient and the receiving authority. In such a case, the patient must make and transmit the reading over again. Thus, it would be advantageous to provide a device that minimizes errors and saves time by simplifying the process of aligning the telephone handset with the transmitter box, and by automatically causing the data that is being transmitted to be retransmitted if the transmission was corrupted.

SUMMARY OF INVENTION

Accordingly, the invention provides a handset orientation tolerant bi-directional acoustic modem. The acoustic modem includes two transducers (a first transducer and a second transducer) and a programmable controller. Each transducer is capable of functioning as both a transmitting unit to emit acoustic signals, and as a receiving unit to receive communication from the central site. After a telephone handset is aligned with the acoustic modem, the controller determines the orientation of the telephone with respect to the two transducers of the acoustic modem. Based on the determination of the orientation, the controller selectively assigns functionality to each of the two transducers. One of the two transducers acts as the receiving unit and the other of the two transducers acts as the transmitting unit. The acoustic modem is coupled to a data source such as an event recorder, and to a converter. The data source acquires biomedical data and the converter receives, amplifies, conditions, and encodes the biomedical data for emission as an acoustic signal by the transmitting unit of the acoustic modem. The acoustic modem may also be coupled to a memory unit that is utilized to store data before transmission to the central site.

For operation, the patient only needs to align the microphone and the speaker of the telephone handset with the two transducers of the acoustic modem. The microphone and the speaker can be aligned with the two transducers in either orientation (i.e., the speaker on the first transducer and the microphone on the second transducer, or the microphone on the first transducer and the speaker on the second transducer). The controller determines which of the two transducers is aligned with the speaker of the handset by sampling both transducers for a detectable dial tone or other tone of the telephone. When a dial tone is properly detected in one of the two transducers, that transducer is assigned the functionality of the receiving unit to receive communication from the central site. The other of the two transducers is then assigned the functionality of the transmitting unit to emit the acoustic signals. After the functionality of each transducer is assigned, the central site is automatically dialed by emitting dialing tones with the transmitting unit. The receiving unit waits for a response from the receiving station of the central site. Once the response is received, the transmission protocol may proceed. After the transmission protocol is completed, the patient completes the process by hanging up the phone.

The transmission protocol of the invention includes a bi-directional transmission of data. The communication of data between the remote location and the central site can be either half duplex or full duplex. In one embodiment, the data is transmitted from the remote location to the central site in small packets of data with sequence numbers. The receiving station acknowledges whether or not the transmission of a small packet of data was proper. This acknowledgement is received by the receiving unit of the acoustic modem. If a negative acknowledgement, or no acknowledgement, is received by the receiving unit, the small packet of data is retransmitted to ensure complete transmission of uncorrupted data. The receiving station is able to organize the small packets of data in proper sequence by sequentially organizing the sequence numbers that are attached to the small packets of data.

These features as well as other advantages of the invention will become apparent upon consideration of the following detailed description and accompanying drawings of the embodiments of the invention described below.

DETAILED DESCRIPTION

Before one embodiment of the invention is explained in full detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of including and comprising and variations thereof herein is meant to encompass the items listed thereafter and equivalents thereof as well as additional items.

Figure 1:
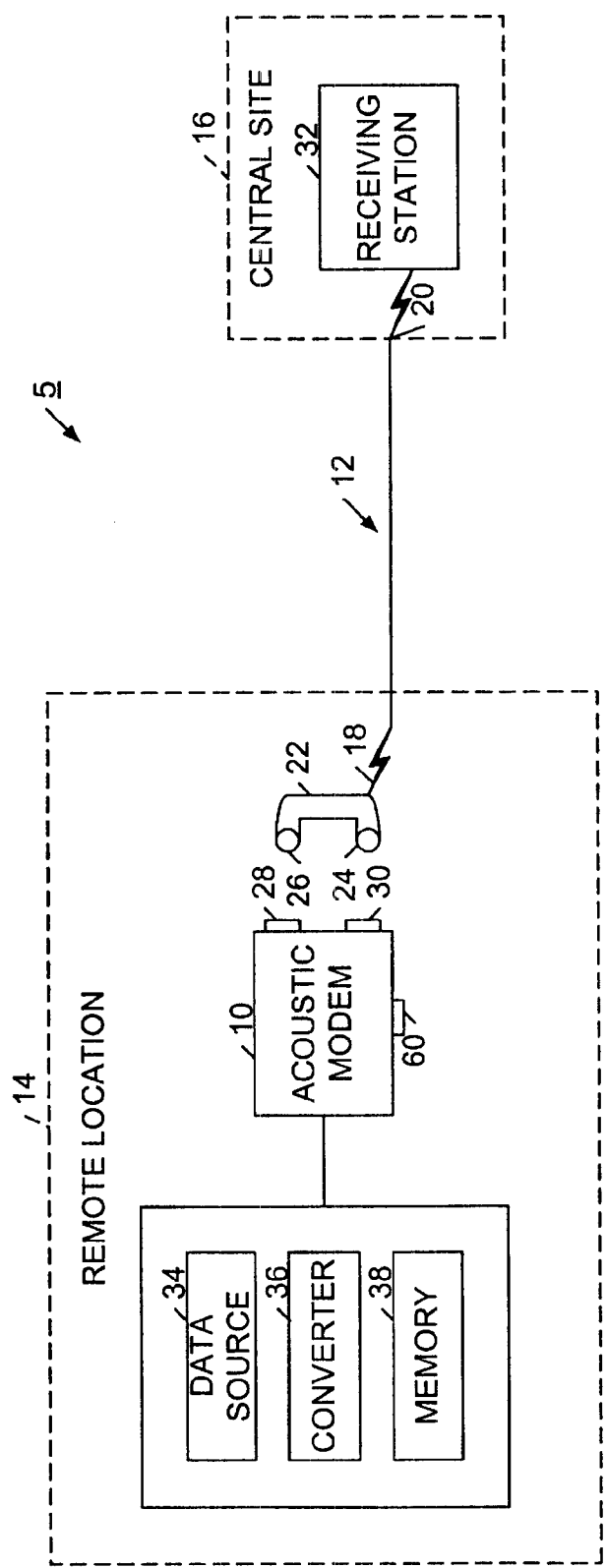
FIG. 1 is a schematic diagram representing a remote monitoring system according to one embodiment of the invention.

FIG. 1 schematically illustrates a remote monitoring system 5 according to one embodiment of the invention. The remote monitoring system 5 includes a handset orientation tolerant bi-directional acoustic modem 10 for communicating data over a telephone line 12. The acoustic modem 10 is located at a remote location 14 from a central site 16. The central site 16 typically is a hospital or physician's office. The telephone line 12 has a first end 18 and a second end 20. The first end 18 is located at the remote location 14 and the second end 20 is located at the central site 16. The first end 18 is coupled to a telephone 22 having a microphone 24 and a speaker 26. The second end 20 is coupled to a receiving station 32 at the central site 16. The acoustic modem 10 includes a first transducer 28 and a second transducer 30. In one embodiment, the first transducer 28 and the second transducer 30 are piezo transducers. As shown in FIG. 1, the acoustic modem 10 may be coupled to a data source 34, a converter 36, or a memory 38 or any combination thereof. The data source 34, the converter 36, the memory 38, and the acoustic modem 10 may also be integral with each other in any combination, and thus, packaged as at least one combined unit, or alternatively, packaged as single units.

The data source 34 can be any event recorder or device that is adapted to acquire biomedical or other data including electrocardiograms, pacemaker readings, respiratory rate, heart rate, impedance measurements for determining tidal volume and minute ventilation, EEG, defibrillator data, data from event recorders and loop recorders, as well as other medical equipment such as IV infusion pumps and more. Furthermore, the data may include any signal, analog or digital, that is convertible to an acoustic signal for transmission from a remote location to a receiving station.

In one embodiment, the acoustic modem 10 of the invention is digital. In another embodiment, the acoustic modem 10 of the invention is analog. The analog acoustic modem may utilize a standard for frequency modulated (FM) analog transmissions, or any other analog standard. Moreover, in some embodiments, the acoustic modem 10 is suited to effect transmission of data through the traditional public-switched telephone network (PSTN), while in other embodiments (not shown), the acoustic modem 10 is adapted to communicate using an internet protocol telephone such as is commonly available from Cisco Systems, Inc. The transmission standard utilized to transfer the data from the remote location 14 to the central site 16 can include any future types of transmission.

The converter 36 receives, amplifies, conditions, and encodes the biomedical or other data from the data source 34 or the memory 38. The design and signal processing utilized by the converter 36 is conventional. Any conversion methodology or techniques now known or later devised may be employed or substituted. The converter 36 does not need to be utilized if the data provided by the data source 34 or the memory 38 is already in a proper format for input to the acoustic modem 10.

The memory 38 can be any conventional type of electronic storage. In one embodiment, the biomedical data is stored after acquisition by the data source 34 and before conversion by the converter 36. In another embodiment, the converted data is stored after conversion by the converter 36 and before input to the acoustic modem. In another embodiment, the biomedical data is not stored in the memory 38.

Figure 2:
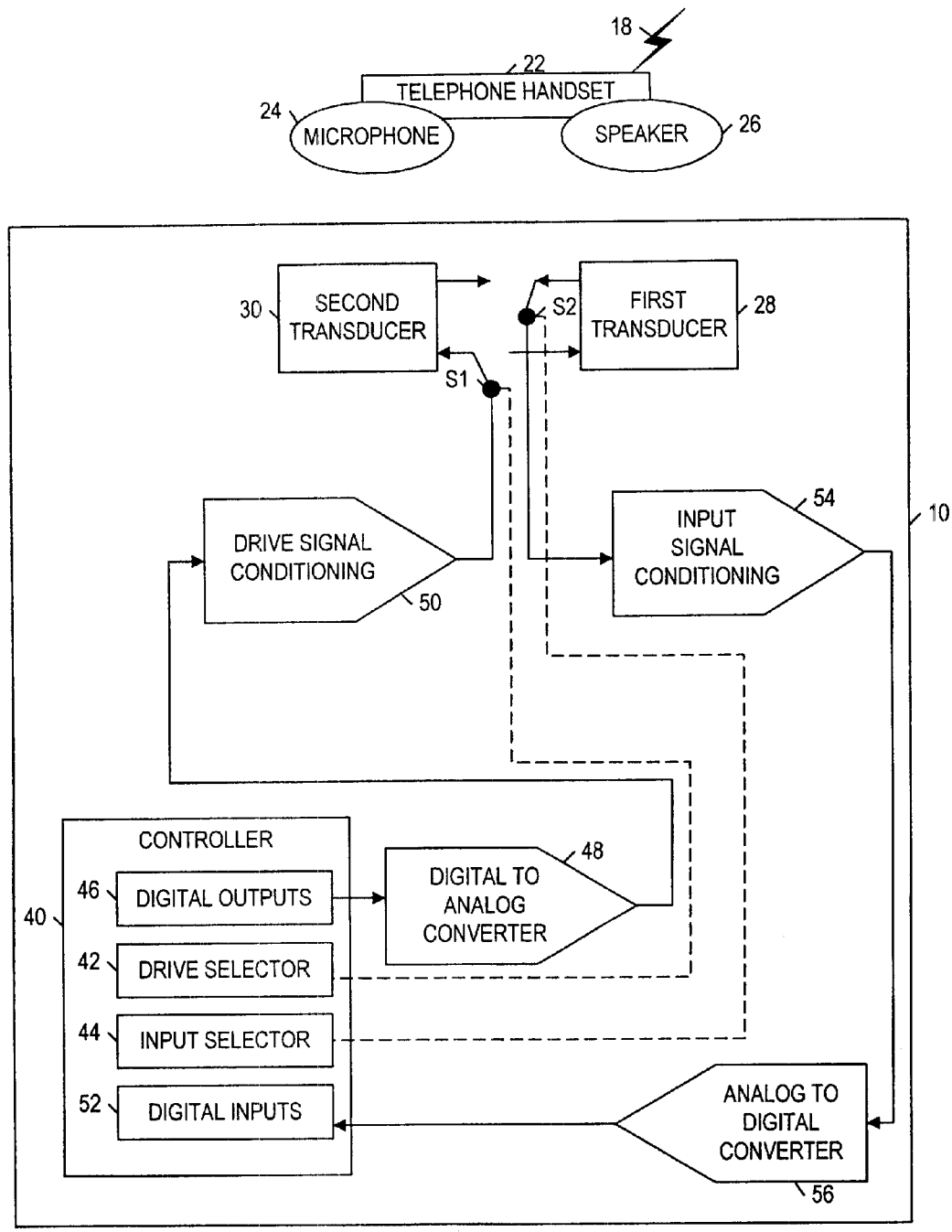
FIG. 2 is a schematic diagram representing a handset orientation tolerant bi-directional acoustic modem according to one embodiment of the invention.

The acoustic modem 10 is further schematically illustrated in FIG. 2. The acoustic modem 10 includes a programmable controller 40. The first transducer 28 and the second transducer 30 are selectively coupled in alternation to the controller 40 by a drive selector 42 and an input selector 44. The drive selector 42 actuates a switch S1 that electrically connects one of the first transducer 28 and the second transducer 30 to the digital output 46 of the controller 40. The signals output from the digital output 46 are sent through a digital-to-analog converter 48 and a drive signal conditioning unit 50 to the one of the first transducer 28 and the second transducer 30 that is electrically connected to the digital output 46. The input selector 44 actuates a switch S2 that electrically connects the other of the first transducer 28 and the second transducer 30 to the digital input 52 of the controller 40. The signals input to the other of the first transducer 28 and the second transducer 30 are sent through an input signal conditioning unit 54 and an analog-to-digital converter 56 to the digital input 52.

In operation, each transducer of the acoustic modem 10 is capable of functioning as both a transmitting unit to emit acoustic signals, and as a receiving unit to receive communication from the central site. After the patient, or someone else acting on their behalf (e.g. the patient may have just experienced a heart condition and is therefore unable to align the phone on their own), aligns the telephone handset 22 with the acoustic modem 10, the controller 40 determines the orientation of the telephone 22 with respect to the first transducer 28 and second transducer 30 of the acoustic modem 10.

Figure 3:
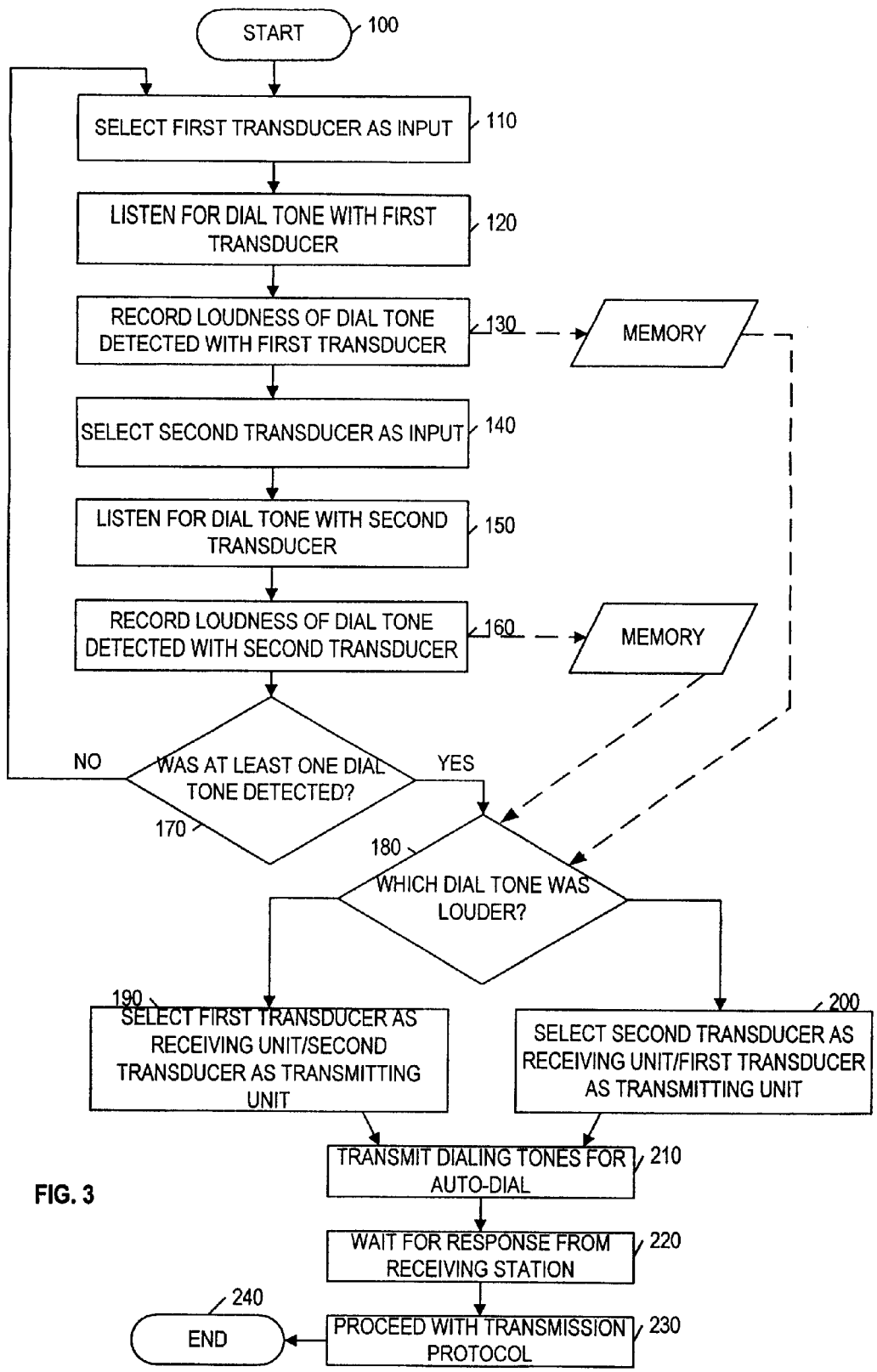
FIG. 3 is a flow chart representing the functionality of the software of the programmable controller.

The software used by the controller 40 to establish the handset orientation is illustrated in the flow chart of FIG. 3. The software determines the orientation of the microphone 24 and the speaker 26 of the telephone 22 with respect to the first transducer 28 and the second transducer 30 of the acoustic modem 10, and accordingly assigns functionality to the first transducer 28 and the second transducer 30. The patient starts the software as shown at step 100. The software can be setup to continuously sample for a detectable dial tone, or setup to only sample for a detectable dial tone when the patient triggers the controller 40 by actuating a switch 60 on the acoustic modem 10. The software preferably continuously samples for a detectable dial tone and is therefore sampling whenever the acoustic modem 10 is turned on.

As shown at step 110, the software selects the first transducer as an input, i.e. the software assigns the first transducer 28 the functionality of the receiving unit. In order to assign functionality of the receiving unit to the first transducer 28, the input selector 44 actuates switch S2 to electrically couple the first transducer 28 to the digital input 52. As shown at step 120, the software directs the first transducer 28 to "listen" for a dial tone for a first duration. In one embodiment the first duration is one half second. The duration can be any amount of time, although it is preferable to have a duration that will quickly detect a telephone handset 22 that is properly orientated with the acoustic modem 10. Any sound that is detected by the first transducer 28 is conditioned by the input signal conditioning unit 54 and then converted from analog to digital by the analog-to-digital converter 56 for input into the digital input 52 of the controller 40. If the noise falls within signal characteristics of a dial tone or other tone of the telephone 22, the controller 40 considers a dial tone to be detected. Although the signal characteristics of dial tones do vary, dial tones generally are pure tones that may include a couple of harmonics and dial tones typically are not modulated. As shown at step 130 the software records the loudness of the dial tone detected with the first transducer. The value of the loudness of the dial tone detected with the first transducer 28 is recorded in a memory unit coupled to the controller that may or may not be memory 38.

As shown at step 140, the software selects the second transducer 30 as an input, i.e., the software assigns the second transducer 30 the functionality of the receiving unit. In order to assign functionality of the receiving unit to the second transducer 30, the input selector 44 actuates switch S2 to uncouple the first transducer 28 from the digital input 52 and electrically couple the second transducer 30 to the digital input 52. As shown at step 150 the software directs the transducer to "listen" for a dial tone for a second duration. In one embodiment the second duration is the same amount of time as the first duration. In other embodiments, the second duration can vary from the first duration, although it is preferable to have a duration that will allow for fast detection of a telephone handset 22 that is properly orientated with the acoustic modem 10. Any sound that is detected by the second transducer 30 is conditioned by the input signal conditioning unit 54 and then converted from analog to digital by the analog-to-digital converter 56 for input into the digital input 52 of the controller 40. If the noise falls within signal characteristics of a dial tone or other tone of the telephone 22, the controller 40 considers a dial tone to be detected. As shown at step 160 the software records the loudness of the dial tone detected with the second transducer. The value of the loudness of the dial tone detected with the second transducer 30 is recorded in the memory unit coupled to the controller in which the loudness of the dial tone detected with the first transducer 28 was recorded if a dial tone was detected with the first transducer 28.

As shown at step 170 the software determines whether at least one dial tone was detected. The software branches back to step 110 if no dial tone was detected, and branches to step 180 if at least one dial tone was detected. At act 180, the software compares the value of the loudness of the dial tone detected with the first transducer 28 to the value of the loudness of the dial tone detected with the second transducer 30, determines which of the two values is greater, and thereby determines which of the two transducers is aligned with the speaker 26 of the telephone 22. The transducer that receives the strongest or loudest dial tone signal is assumed to be the best transducer to serve as the receiving unit for the acoustic modem 10. A dial tone may be detected by both transducers due to the proximity of each transducer to the speaker 26 of the telephone 22. If only one dial tone was detected, the value of loudness of the dial tone detected by the other transducer will be zero and therefore necessarily less than the value of the loudness of the dial tone detected.

If the first transducer 28 properly detected a louder (or the only) dial tone, the software branches from step 180 to step 190, and selects the first transducer as the receiving unit and the second transducer as transmitting unit. The input selector 44 actuates switch S2 to electrically couple the first transducer to the digital input 52, thereby assigning the first transducer 28 functionality of the receiving unit. The drive selector 42 actuates switch S1 to electrically couple the second transducer to the digital output 46, thereby assigning the second transducer 30 functionality of the transmitting unit.

If the second transducer 30 properly detected a louder (or the only) dial tone, the software branches from step 180 to step 200, and selects the second transducer as the receiving unit and the first transducer as transmitting unit. The input selector 44 actuates switch S2 to electrically couple the second transducer 30 to the digital input 52, thereby assigning the second transducer 30 functionality of the receiving unit. The drive selector 42 actuates switch S1 to electrically couple the first transducer 28 to the digital output 46, thereby assigning the first transducer 28 functionality of the transmitting unit.

As shown at step 210 the software transmits dialing tones with the transmitting unit to auto-dial the receiving station 32 of the central site 16. Auto-dialing removes another step of patient intervention in the process. If a patient is unable to dial, or if the number of the receiving station 32 of the central site 16 is forgotten, the patient needs only to align the telephone 22 with the acoustic modem 10 and wait while the biomedical data is automatically transmitted.

As shown at step 220 the software waits until an acknowledgement from the receiving station 32 is received by the receiving unit of the acoustic modem instructing the software that the receiving station is ready to proceed with the communication of data.

As shown at step 230 the software proceeds with the communication of the data from the remote location 14 to the central site 16. The remote monitoring system 5 is adapted to communicate data between the remote location 14 and the central site 16. The communication between the remote location 14 and the central site 16 can be either half duplex or full duplex. If the communication of data is full duplex, both the remote location 14 and the central site 16 can transmit data at the same time. In order to have full duplex communication, the acoustic sounds transmitted from the remote location 14 cannot have an overlapping frequency range with the acoustic sounds transmitted from the central site 16. If the acoustic signals that are being simultaneously transmitted do have overlapping frequency ranges, the data will be corrupted and will be unusable for purposes of monitoring the patient. If the communication of data is half duplex, only one of the remote location 14 and the central site 16 can transmit data at any one time. However, half duplex communication allows for use of the complete frequency range available to the location that is transmitting the data, and therefore, half duplex communication generally allows for higher bit rates than full duplex communication. When half duplex communication is utilized to transmit the data between the remote location 14 and the central site 16, the data is transmitted from the remote location 14 to the receiving station 32 of the central site 16 in small packets of data with sequence numbers. The receiving station 32 acknowledges whether or not the transmission of a small packet of data was proper. This acknowledgement is received by the receiving unit of the acoustic modem 10. If a negative acknowledgement (or no acknowledgement) is received by the receiving unit, the small packet of data is retransmitted to ensure complete transmission of uncorrupted data. The receiving station 32 is able to organize the small packets of data in proper sequence by sequentially organizing the sequence numbers that are attached to the small packets of data. In one embodiment, the transmit bit rate of the communication of data from the central site 16 to the remote location 14 is slower than the transmit bit rate of the communication of data from the remote location 14 to the central site 16.

Once the communication of data is completed, the software proceeds to step 240. If the acoustic modem 10 is set up to continuously monitor for a detectable dial tone, then the software automatically returns to step 100 and begins sampling each transducer as discussed above. If the acoustic modem 10 is set up to monitor when the switch 60 is actuated, the software shuts down and waits until it is powered up again to begin sampling for a detectable dial tone.

The biomedical data is converted into an acoustic signal that is emitted by the transmitting unit of the acoustic modem 10. The transmitting unit of the acoustic modem 10 is disposed within acoustic range of, or adjacent to the microphone 24 of the telephone 22. The acoustic signal is then transmitted from the telephone 22 over the telephone line 12 to the receiving station 32 at the central site 16. The acoustic signal is received by the computer system at the receiving station 32 and is then translated by a converter back to the biomedical data that was acquired from the patient.

In the preferred embodiment, the receiving station 32 of the central site 16 communicates with the acoustic modem 10 using a computer system. This eliminates the requirement of having a receiving authority at the central site 16 to communicate with the patient and facilitate the transmission of data. Thus, the patient is able to automatically transmit biomedical data at any time during the day or night.

It should be apparent from the discussion above and to those of ordinary skill in the art that the exact configuration of the controller 40 could be varied. For example, many of the individual components describe above could be combined on a single integrated circuit or chip and features and components could be implemented in either hardware or software.

Various features and advantages of the invention are set forth in the following claims.

What is claimed is:

1. An acoustic modem comprising:
    a first transducer operable as a receiving unit under a first condition and as a transmitting unit under a second condition;
    a second transducer operable as a transmitting unit under the first condition and as a receiving unit under the second condition; and
    a controller capable of selectively determining the presence of a one of the first condition and the second condition.

2. An acoustic modem as set forth in claim 1 wherein the first transducer is a piezo film transducer.

3. An acoustic modem as set forth in claim 1 wherein the second transducer is a piezo film transducer.

4. An acoustic modem as set forth in claim 1 wherein the controller selectively determines the presence of the first condition when a dial tone is detected only by the first transducer.

5. An acoustic modem as set forth in claim 1 wherein the controller selectively determines the presence of the second condition when a dial tone is detected only by the second transducer.

6. An acoustic modem as set forth in claim 1 wherein the controller selectively determines the presence of the first condition when a dial tone is detected by the first transducer and the second transducer, and a loudness of the dial tone detected by the first transducer is greater than a loudness of the dial tone detected by the second transducer.

7. An acoustic modem as set forth in claim 1 wherein the controller selectively determines the presence of the second condition when a dial tone is detected by the first transducer and the second transducer, and a loudness of the dial tone detected by the second transducer is greater than a loudness of the dial tone detected by the first transducer.

8. An acoustic modem as set forth in claim 1 wherein the acoustic modem is coupled to a data source and a converter.

9. An acoustic modem as set forth in claim 8 wherein the data source is an event recorder and the data is biomedical data obtained from a patient.

10. An acoustic modem as set forth in claim 8 wherein the converter receives, amplifies, conditions, and encodes the data from the data source.

11. An acoustic modem as set forth in claim 1 wherein the controller includes a drive selector.

12. An acoustic modem as set forth in claim 11 wherein the drive selector electrically couples an output of the controller to the second transducer during the first condition and the first transducer during the second condition.

13. An acoustic modem as set forth in claim 1 wherein the controller includes an input selector.

14. An acoustic modem as set forth in claim 13 wherein the input selector electrically couples an input of the controller to the first transducer during the first condition and the second transducer during the second condition.

15. A method of detecting an orientation of a telephone handset with respect to a first transducer and a second transducer of an acoustic modem, the method comprising:
    sampling the first transducer for a detectable dial tone;
    sampling the second transducer for a detectable dial tone;
    determining if a dial tone was detected;
    ceasing the sampling of the first transducer and the second transducer when a dial tone is detected;
    using the first transducer as a receiving unit and the second transducer as a transmitting unit when a dial tone is detected in the first transducer; and
    using the second transducer as a receiving unit and the first transducer as a transmitting unit when a dial tone is correctly detected in the second transducer.

16. A method as set forth in claim 15 wherein the step of ceasing the sampling only occurs after the first transducer and the second transducer have been sampled an equal number of times.

17. A method as set forth in claim 16, and further comprising:
    recording a loudness of the dial tone detected by the first transducer;
    recording a loudness of the dial tone detected by the second transducer; and
    comparing the loudness of the dial tone detected by the first transducer with the loudness of the dial tone detected by the second transducer when a dial tone is detected by both the first transducer and the second transducer.

18. A method as set forth in claim 17, and further comprising:

using the first transducer as a receiving unit and the second transducer as a transmitting unit when the loudness of the dial tone detected by the first transducer is greater than the loudness of the dial tone detected by the second transducer; and using the second transducer as a receiving unit and the first transducer as a transmitting unit when the loudness of the dial tone detected by second transducer is greater than the loudness of the dial tone detected by the first transducer.

19. A method as set forth in claim 15 wherein a controller cycles between sampling the first transducer for a first duration and sampling the second transducer for a second duration.

20. A method as set forth in claim 19 wherein the controller cycles back and forth between sampling the first transducer and the second transducer until a dial tone is detected.

21. A method as set forth in claim 20 wherein the controller ends the cycling back and forth after the second transducer has been sampled the same number of times as the first transducer.

22. A method as set forth in claim 19 wherein the first duration is equal to the second duration.

23. A method as set forth in claim 19 wherein the first duration is half a second.

24. A method as set forth in claim 19 wherein the second duration is half a second.

25. A method as set forth in claim 15 wherein the first transducer is a piezo film transducer.

26. A method as set forth in claim 15 wherein the second transducer is a piezo film transducer.

27. A method of communicating data over a telephone line from a data source located at a remote location to a receiving station located at a central site, the telephone line including a first end at the remote location coupled to a telephone having a microphone and a speaker, and a second end coupled to the receiving station at the central site, the method comprising:

orientating the microphone and the speaker of the telephone over two transducers of an acoustic modem at the remote location;

determining the orientation of the microphone and the speaker of the telephone with respect to the two transducers;

utilizing a first transducer of the two transducers of the acoustic modem as a receiving unit under a first condition and as a transmitting unit under a second condition based on the step of determining the orientation;

utilizing a second transducer of the two transducers of the acoustic modem as a receiving unit under a second condition and as a transmitting unit under a first condition based on the step of determining the orientation; and communicating the data over the telephone line using the acoustic modem.

28. A method as set forth in claim 27, and further comprising auto-dialing the receiving station of the central site by transmitting dialing tones through the transmitting unit.

29. A method as set forth in claim 27, and further comprising determining when the receiving station of the central site is online and ready to receive a transmission of data over the telephone line.

30. A method as set forth in claim 27, and further comprising receiving an acknowledgement from the receiving station of a proper transmission of data.

31. A method as set forth in claim 27 wherein the step of communicating the data over the telephone line using the acoustic modem includes transmitting the data in packets with sequence numbers.

32. A method as set forth in claim 31, and further comprising retransmitting portions of the data.

33. A method as set forth in claim 32 wherein the portion of the data that is retransmitted are the packets that do not receive an acknowledgement from the receiving station of proper transmission.

34. A method as set forth in claim 27, and further comprising converting the data from an electrical signal into an acoustic signal.

35. A method as set forth in claim 34, and further comprising transmitting the acoustic signal from the transmitting unit of the acoustic modem to the microphone of the telephone.

36. A method as set forth in claim 35 wherein the transmitting unit is disposed within an acoustic range of, or adjacent to, the microphone of the telephone such that the transmitting unit inputs acoustic signals into the microphone of the telephone.

37. A method as set forth in claim 27 wherein the step of determining the orientation of the microphone and the speaker of the telephone with respect to the two transducers includes detecting a dial tone by at least one of the two transducers.

38. A method as set forth in claim 37 wherein the first condition exists, and the first transducer is thereby utilized as a receiving unit and the second transducer as a transmitting unit, when a dial tone is detected only by the first transducer.

39. A method as set forth in claim 37 wherein the second condition exists, and the first transducer is thereby utilized as a transmitting unit and the second transducer as a receiving unit, when a dial tone is detected only by the second transducer.

40. A method as set forth in claim 37 wherein the first condition exists, and the first transducer is thereby utilized as a receiving unit and the second transducer as a transmitting unit, when a dial tone is detected by the first transducer and the second transducer, and a loudness of the dial tone detected by the first transducer is greater than a loudness of the dial tone detected by the second transducer.

41. A method as set forth in claim 37 wherein the second condition exists, and the first transducer is thereby utilized as a transmitting unit and the second transducer as a receiving unit, when a dial tone is detected by the first transducer and the second transducer, and a loudness of the dial tone detected by the second transducer is greater than a loudness of the dial tone detected by the first transducer.

42. A method as set forth in claim 27 wherein the first transducer is a piezo film transducer.

43. A method as set forth in claim 27 wherein the second transducer is a piezo film transducer.

44. A method as set forth in claim 27 wherein the step of communicating the data over the telephone line using the acoustic modem includes transmitting data from the remote location to the central site and receiving data at the remote location from the central site.

45. A method as set forth in claim 44 wherein transmission has a transmit bit rate and the receiving has a receive bit rate.

46. A method as set forth in claim 45 wherein the transmit bit rate is faster than the receive bit rate.

* * * * *